United States Patent [19]
Adachi

[11] 3,933,230
[45] Jan. 20, 1976

[54] CLUTCH WITH DISC RELEASE SPRING
[75] Inventor: Kazuma Adachi, Yao, Japan
[73] Assignee: Kabushiki Kaisha Daikin Seisakusho, Osaka, Japan
[22] Filed: June 3, 1974
[21] Appl. No.: 475,873

Related U.S. Application Data
[62] Division of Ser. No. 300,366, Oct. 24, 1972, Pat. No. 3,834,501.

[30] Foreign Application Priority Data
Nov. 17, 1971  Japan.............................. 46-107639

[52] U.S. Cl.......... 192/70.28; 192/111 A; 192/89 B
[51] Int. Cl.²......................................... F16D 13/75
[58] Field of Search............ 192/70.28, 111 A, 89 B

[56] References Cited
UNITED STATES PATENTS
| | | | |
|---|---|---|---|
| 3,613,849 | 10/1971 | Pape ................................ | 192/111 A |
| 3,702,651 | 11/1972 | Fujita et al...................... | 192/70.28 |
| 3,791,502 | 2/1974 | Nakane............................ | 192/70.28 |
| 3,834,501 | 10/1974 | Adachi.............................. | 192/89 B |

FOREIGN PATENTS OR APPLICATIONS
| | | | |
|---|---|---|---|
| 570,236 | 4/1924 | France............................ | 192/70.29 |
| 951,512 | 10/1949 | France............................ | 192/70.28 |

*Primary Examiner*—Benjamin W. Wyche
*Attorney, Agent, or Firm*—Holman & Stern

[57] ABSTRACT

A device comprising a clutch disc having clutch facings between a flywheel and a pressure plate, a main drive shaft splined to a spline hub of the clutch disc for conjoint rotation therewith, a pilot bearing for supporting an end of the main drive shaft rotatably on the flywheel, a spring member interposed between the splined hub and a portion of the pilot bearing to be rotated conjointly with the main drive shaft for moving the clutch disc to a neutral position upon disengagement of the clutch, and means for determining the neutral position.

2 Claims, 2 Drawing Figures

CLUTCH WITH DISC RELEASE SPRING

This is a divisional of application Ser. no. 300,366, filed Oct. 24, 1972 and now U.S. Pat. No. 3,834,501.

BACKGROUND OF THE INVENTION

The present invention relates generally to a device for preventing improper disengagement of a clutch, and more particularly it relates to a device for forcibly moving the clutch disc to a neutral position upon disengagement of the clutch to release the clutch facings from the friction surfaces of both the flywheel and pressure plate and thereby prevent improper disengagement of the clutch.

Generally, the spline hub of a clutch disc is splined to a main drive shaft for rotation therewith so that when the clutch is engaged or disengaged the clutch disc is movable in its axial direction. Thus with this type of clutch, the spline hub must be smoothly movable on the main drive shaft in the axial direction every time the clutch is engaged or disengaged.

However, the splined portion is subject directly or indirectly to resonance caused by high speed rotation of the main drive shaft or to small vibration due to high speed driving of a motor vehicle to undergo oxidation or wear, or a foreign matter may get in the splined portion, thereby impeding the movement of the spline hub.

Moreover, heat generation or the like, caused by the sliding friction between the clutch facings and the friction surfaces of the flywheel and the pressure plate, will give rise to sticking contact between the facings and the friction surfaces to likewise hinder the aforementioned movement of the clutch disc.

If the movement of the clutch disc to a neutral position is thus impeded when the clutch is disengaged, there arises stick slippage or the like between the clutch facing and the friction surface of the flywheel, making it impossible to effect complete separation in spite of the disengagement of the clutch, which for instance will seriously affect a speed changing operation and markedly reduce the life of the clutch facing.

SUMMARY OF THE INVENTION

An object of this invention is to provide a device for preventing improper disengagement having a very simple construction and yet capable of forcibly and positively moving the clutch disc to its neutral position upon disengagement of the clutch.

Another object of this invention is to improve the clutch operation of engagement and disengagement.

Still another object of this invention is to make it easy to determine the neutral position of the clutch disc when the flywheel is subjected to lathe turning for correction.

According to this invention there is provided spring means between the end face of the spline hub and a portion of pilot bearing which is rotatable conjointly with a main drive shaft, the pilot bearing supporting the end of the main drive shaft rotatably on a flywheel. The spring means urges the clutch disc to its neutral position upon disengagement of the clutch.

The spring means accumulates its resilient force when the clutch facing is pushed by the pressure plate upon a clutch engaging action and exerts the resilient force on the spline hub on the main drive shaft. Accordingly upon disengagement of the clutch, the spring means with its resilient force forcibly moves the spline hub in the clutch disengaging direction on the main drive shaft, the spring means being such that upon the clutch disc reaching its neutral position it releases all the accumulated force, exerting no force on the spline hub at the neutral position.

The neutral position of the clutch disc when the clutch is in a disengaged state is adjusted by the spring means and a suitable number of shims interposed between the spring means and a member for supporting one end of the spring means and further by another spring means disposed in counteracting relation to the spring means.

According to this invention, the clutch disc is forced to its neutral position upon a clutch disengaging action. Even if oxidation or wear takes place at the portion where the shaft is splined to the spline hub, the spring means assures movement of the clutch disc to the neutral position when the clutch is disengaged.

In the case where the friction surface of the flywheel is subjected to lathe turning for correction, an increased space will be produced between the friction surface and the clutch facing when the clutch is in a disengaged state, resulting in a greater stroke of clutch disc for engagement of the clutch which affects the clutch operation of engagement and disengagement.

According to this invention, however, one to several shims will then be removed or the spring means may be replaced to shift the neutral position of the clutch disc toward the flywheel by an amount corresponding to the dimension corrected by lathe turning. In this way the deterioration of the clutch operation can be remedied, with no difficulties encountered during the correction procedure.

Figure 1:
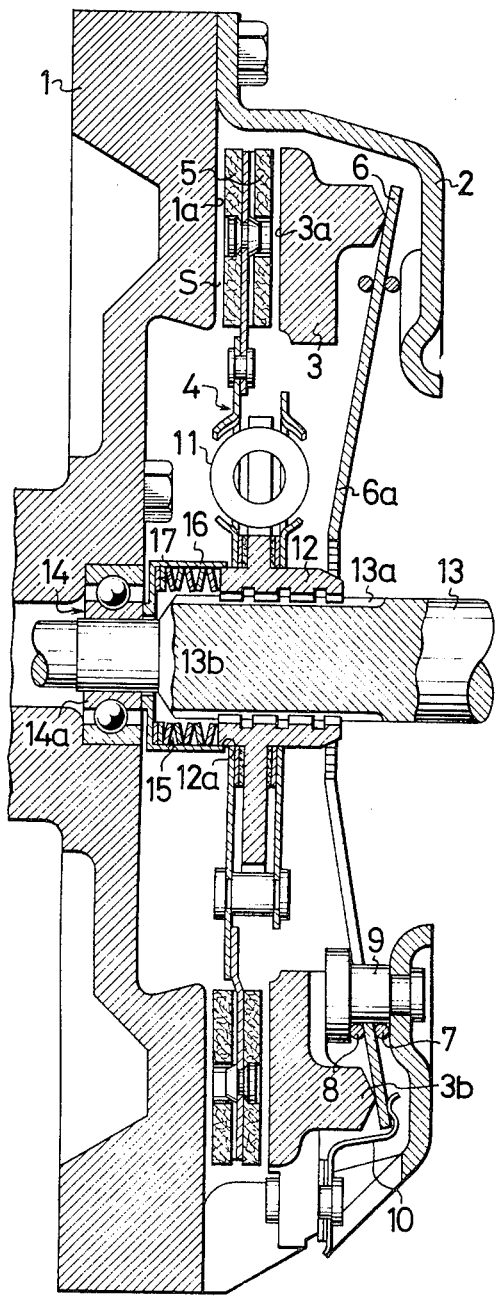
FIG. 1 is a view in vertical section showing the principal parts of an embodiment of this invention as the clutch is in a disengaged position.

DESCRIPTION OF THE PREFERRED EMBODIMENTS 1a of the flywheel and the friction surface 3a Referring to FIG. 1, a flywheel 1 is connected to the shaft of an unillustrated motor for rotation. A pressure plate 3 is retained by a clutch cover 2 and is movable only in an axial direction. Clutch facings 5 of a clutch disc 4 are interposed between the flywheel 1 and the pressure plate 3. The pressure plate 3 is urged to the left in the figure under the restoring force of a diaphragm spring 6. A clutch engaging action causes the clutch facings 5 to be clamped between the friction surface 1a of the flywheel and the friction surface 3a of the pressure plate for the transmission of torque.

A diaphragm spring 6 is fulcrumed on wire rings 7 and 8 and supported by the clutch cover 2 through a connecting member 9 together with the rings 7 and 8. The diaphragm spring 6 is retained at several portions along its outer periphery on several projections 3b of the pressure plate 3 by means of clips 10. The spring 6 urges the pressure plate 3 as already described. An operation to disengage the clutch causes unillustrated clutch release bearing means to push the spring 6 leftward at its inner peripheral fingers 6a, whereby the spring is turned on the fulcrumed portions, permitting the pressure plate 3 to be urged rightward from the clutch engaging position to the illustrated position to free the clutch facings 5 from the clamping force for disengagement of the clutch.

The clutch disc 4 has a spline hub 12 connected to the clutch facings 5 through means such as a torsion spring 11 for attenuating vibration in the direction of rotation. The splined portion 13a of a main drive shaft 13 is fitted into the splined bore of the hub 12, the clutch disc 4 thus being supported on the shaft 13 so as to be rotatable on the main drive shaft 13 conjointly therewith and movable on the shaft 13 axially thereof as already known.

The main drive shaft 13 has an end 13b fitted in the inner ring 14a of a pilot bearing 14 supported on the flywheel 1 and is therefore free to rotate independently of the flywheel 1.

When the pressure plate 3 is moved to the right by a clutch disengaging operation, the load on the clutch disc 4 acts between the clutch facing 5 and the friction surface 1a of the flywheel to release the facing 5 from the friction surface 1a, with the spline hub 12 moved slidingly leftward on the splined portion 13a of the shaft, with the result that the clutch disc 4 is brought to its neutral position.

In the case of clutches of the type described, it is therefore absolutely required that the spline hub 12 be smoothly movable on the splined shaft axially thereof when the clutch is disengaged. Accordingly, oxidation, wear and the like which impede such movement as already described seriously deteriorate the engaging and disengaging functions of the clutch, especially disengaging function thereof.

According to the present invention, the foregoing construction further includes spring means 15 disposed between the spline hub 12 and the inner ring 14a of the pilot bearing 14 for forcibly moving the clutch disc 4 to its neutral position when the clutch is disengaged. As shown in the drawing, the spring means 15 comprises a number of dished springs housed in a holder 16 and arranged in alternate orientation so that when the pressure plate 3 presses the clutch disc 4 against the flywheel 1 for engagement of the clutch, the spring means 15 can accumulate a sufficient resilient force therein for moving the clutch disc 4 to its neutral position upon a clutch disengaging operation.

The holder 16 is cylindrical and has one end fitted around the cylindrical portion 12a of the spline hub 12 in axially slidable fashion and the other end formed with an annular bottom in contact with the end face of inner ring 14a of the pilot bearing 14. The spring means 15 housed in the holder and comprising a combination of dished springs has one end in contact with the inner face of the annular bottom and the other end abutting against the end face of the spline hub 12.

When urged leftward by a clutch engaging operattiion, the clutch disc 4 compresses the spring means 15, which in turn forcibly urges the clutch disc 4 rightward through the spline hub 12 upon disengagement of the clutch. The resilient force of the spring means 15 acting on the spline hub 12 is so determined as to reduce to zero when the clutch disc 4 reaches its neutral position, no longer causing the clutch disc 4 to move further rightward. In other words, the spring means 15 is designed to have a free length corresponding to such length as to push the spring hub 12 to the neutral position.

Due to frequent engagement and disengagement of the clutch, heat will accumulate in the friction surface 1a of the flywheel to cause heat cracking or the friction surface 1a may be worn away, resulting in deterioration of its function of engagement and disengagement. In such case, the friction surface 1a is usually subjected to lathe turning for correction.

The correction, however, increases the space S between the friction face 1a and the facing 5 located at the neutral position when the clutch is in a disengaged state, necessitating a greater amount of leftward displacement of the clutch disc 4 for engagement of the clutch and giving rise to a prolonged period of sliding friction between the friction surface 3a of the pressure plate and clutch facing 5, both of which will then be adversely affected. In addition, the stroke of the hub to compress the spring means 15 will increase, accumulating a greater force in the spring means 15 than was initially designed upon engagement of the clutch to impair the clutch operation of engagement. Moreover, a greater resilient force will act on the spline hub 12 upon disengagement of the clutch to give a greater inertia of movement, which causes the clutch disc to move further rightward beyond its neutral position, causing the clutch facing 5 on the opposite side to come into contact with the friction surface 3a of the pressure plate. Consequently, the clutch disc 4 will follow the pressure plate 3 for rotation to cause improper disengagement of the clutch.

To prevent this, a suitable number of annular shims 17 are interposed between the annular bottom of the holder 16 and the end of the spring means 15. The shims 17 may be provided between the spring means 15 and the end face of the spline hub 12.

Thus every time the friction surface 1a of the flywheel is subjected to lathe turning for correction, shims 17 are removed in corresponding relation, in thickness, to the dimension of correction, whereby the neutral position of the clutch disc 4 is shifted to the left by that amount so as to adjust the space S between the friction face 1a of the flywheel and the clutch facing 5 to the initially determined dimension as designed.

The spring means 15 comprising the combination of dished springs assures easy adjustment of the space S since if a large dimensional correction has to be made a dished spring or a dished spring and shim can be removed instead of removing only the shims.

The holder 16, being in the form of a cylinder fitting around the cylindrical spline hub 12, serves to retain the spring means 15 in accurate position against dropping.

Figure 2:
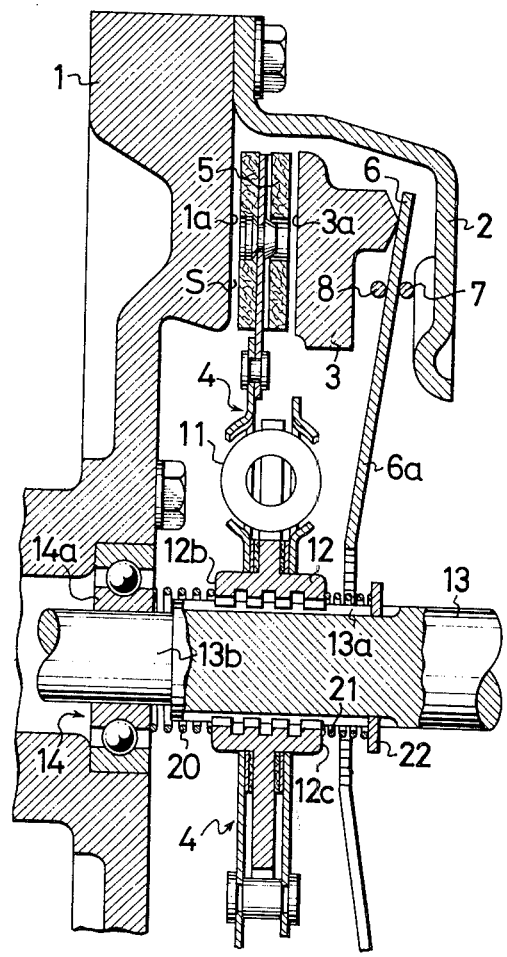
FIG. 2 is a fragmentary view in vertical section showing the principal parts of another embodiment of this invention as the clutch is in a disengaged position.

FIG. 2 shows another embodiment wherein coil spring members 20 and 21 are used in place of spring means 15 comprising the combination of dished spring shown in FIG. 1. For the determination of the neutral position of the clutch disc 4, a coil spring 21 is provided in a counteracting relation to the coil spring 20. Members similar to those in FIG. 1 are referred to by the same reference numerals.

The first coil spring 20 has one end in contact with the end face of inner ring 14a of the pilot bearing 14 and the other end in contact with the left end face 12b of the spline hub 12 so that the clutch disc 4 can be moved to its neutral position upon disengagement of the clutch. The second coil spring 21 has one end in contact with a stop ring 22 fixedly mounted on the main shaft 13 and the other end abutting against the right end face 12c of the spline hub 12, the coil spring 21 thus being in a counteracting relation to the first coil spring 20. The coil springs 20 and 21 are in balance with each other in resilient force to retain the clutch disc 4 in its neutral position.

A clutch disengaging action therefore causes the clutch disc 4 to be forcibly moved to the neutral position where the active forces of the two coil springs 20 and 21 are in balance to prevent improper disengagement of the clutch. If it becomes necessary to adjust the neutral position, one or both of the coil springs 20 and 21 may be replaced with a spring having a different free length, whereby the position where the resilient forces of the two springs are in balance can be changed.

Shims similar to those in FIG. 1 may be provided in abutting contact with the coil springs 20 and 21.

Although the foregoing embodiments are of such type that the clutch is engaged and disengaged by means of a diaphragm spring, the present invention can likewise be applied to clutches of the type wherein clutch release levers already known are substituted for the diaphragm spring for engagement and disengagement of the clutch, without departing from the principle of the invention. Such change is included within the scope of this invention.

What is claimed is:

1. A device for preventing improper disengagement of a clutch comprising a combination of: a clutch disc having clutch facings disposed between a flywheel and a pressure plate, a main drive shaft fitted in a spline hub of the clutch disc through spline engagement to support the clutch disc in an axially movable manner, a pilot bearing for rotatably supporting an end of the main drive shaft on the flywheel, and spring means interposed between the inner ring of the pilot bearing and the spline hub to accumulate therein a resilient force when the clutch is in an engaged state, the spring means including a combination of a plurality of dished springs housed and retained in a cylindrical holder, the cylindrical holder having one end slidably fitted around a cylindrical portion of the spline hub and the other end in abutting contact with the inner ring of the pilot bearing, the dished springs being arranged in alternate orientation, the spring means being operable to forcibly push the clutch disc to its neutral position upon a clutch disengaging operation, the pushing force of the spring means being so determined as to be reduced to zero when the clutch disc reaches the neutral position.

2. The device as set forth in claim 1 wherein the spring means is provided with a plurality of removable shims between one end thereof and the seat thereof.

* * * * *